Sept. 6, 1955 J. B. McGAY ET AL 2,716,860
PNEUMATICALLY WOUND DRIVE MECHANISM
Filed Aug. 21, 1952 2 Sheets-Sheet 1

INVENTORS
JOHN B. McGAY
GILBERT B. CLIFT
BY Strauch, Nolan & Diggins
ATTORNEYS

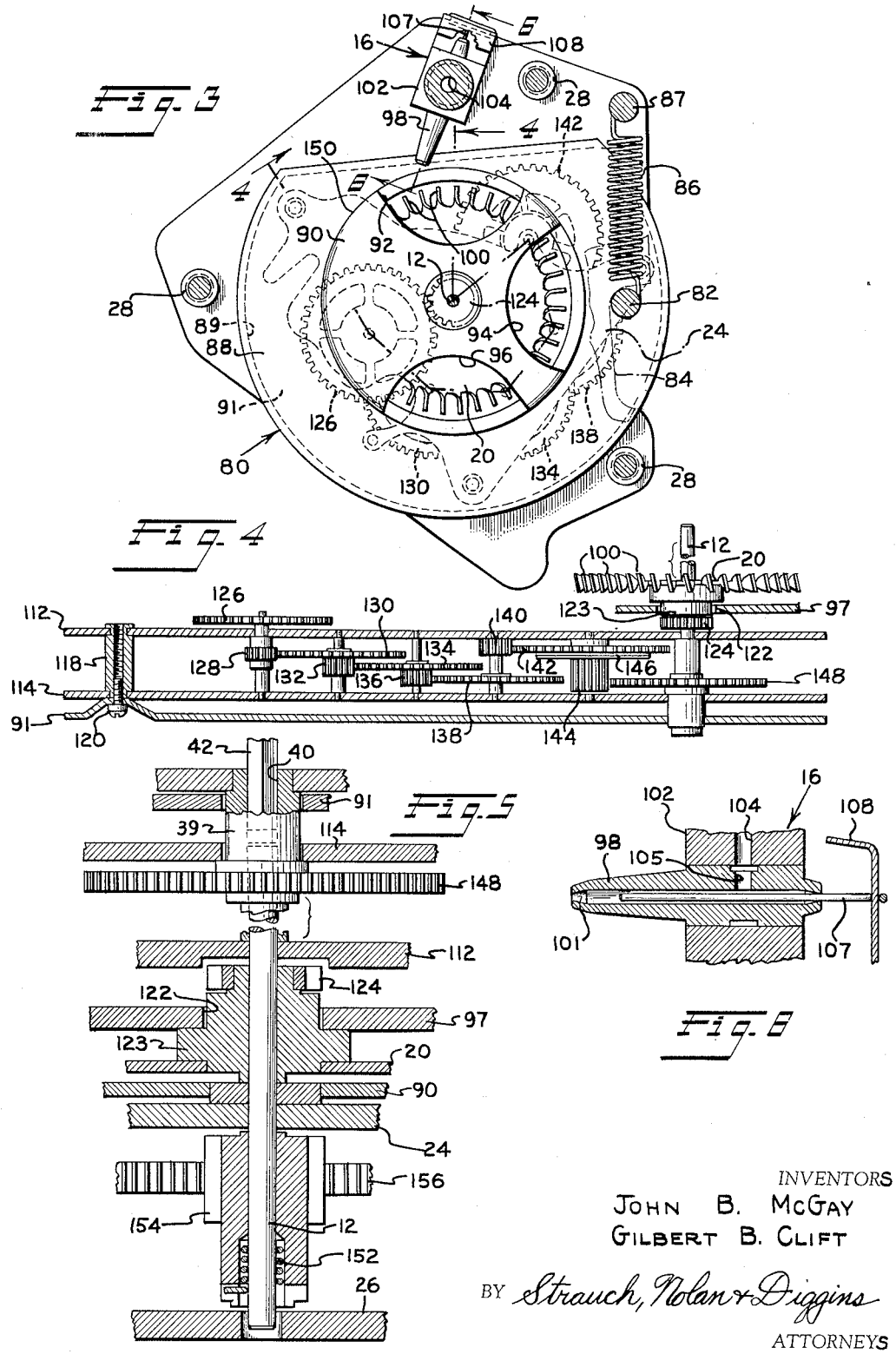

United States Patent Office 2,716,860
Patented Sept. 6, 1955

2,716,860

PNEUMATICALLY WOUND DRIVE MECHANISM

John B. McGay and Gilbert B. Clift, Tulsa, Okla., assignors to Rockwell Manufacturing Company, Pittsburgh, Pa., a corporation of Pennsylvania Application August 21, 1952, Serial No. 305,606

8 Claims. (Cl. 60—7)

The present invention relates to improvements in pneumatic drives for escapement controlled power output shafts, and more particularly relates to pneumatic drives for escapement controlled drive shafts of recording mechanisms such as those used in orifice meters and the like. An example of a recording mechanism to which the drive mechanism of the present invention is applicable will be found in United States Letters Patent No. 1,749,094, issued March 4, 1930, to J. R. Armstrong for Integrating and Recording Device for Fluid Meters. An example of prior art pneumatic drives for escapement controlled drive shafts will be found in United States Letters Patent No. 2,004,909, issued June 11, 1935, to A. F. Benson for Clock.

The prior pneumatically powered mechanisms for applying a drive torque to an escapement controlled drive shaft have certain disadvantages including the lack of ease in assembly and disassembly for purposes of cleaning and inspection and the complexity of and lack of linear variation in the operation of the control of the operation of such mechanism.

It is, accordingly, a primary object of the present invention to provide an improved simple compact pneumatically powered drive mechanism for applying drive torque to an escapement controlled drive shaft for a recording device such as those used in orifice meters and the like.

It is a further object of the present invention to provide an improved pneumatically powered drive mechanism for applying drive torque to an escapement controlled drive shaft which is formed of several compact sub-assemblies which may be readily assembled and disassembled for inspection and cleaning and which is of such construction that the rate of energy extraction from a stream of motive fluid is simply and accurately controlled in accordance with the rate of energy transmission to such drive shaft.

More specifically, it is an object of the present invention to provide a drive mechanism for an escapement controlled power output shaft which is effective automatically to extract predetermined proportions of the energy of a fluid stream and transmit such extracted energy of the escapement controlled drive shaft in proportion to the escapement controlled rate of rotation thereof.

Still more specifically, it is an object of the present invention to provide a drive mechanism for an escapement controlled drive shaft in which a fluid stream powered turbine rotor is drive connected through an energy storage device to the drive shaft and which is of such construction that the rate of energy extraction from the stream by the turbine rotor is automatically controlled in accordance with the rate of energy transmission from the storage device to the drive shaft.

A further object of the present invention is the provision of an improved pneumatically powered drive of an escapement controlled drive shaft in which the rate of energy extraction by a turbine rotor from a fluid stream is controlled by the provision of a movable shield for the turbine rotor which is actuated in accordance with the relation of the rate of rotor rotation to the rate of drive shaft rotation and which is effective by such actuation to control by substantially linear variation the proportion of such fluid stream which impinges upon the turbine rotor.

A further object of the present invention is to provide, in combination with an escapement controlled drive shaft and a pneumatically powered drive therefor, an improved nozzle construction for directing fluid under pressure in a stream for impingement upon a turbine wheel of such mechanism which can be readily cleaned during actual operation of such mechanism to, thus, eliminate the necessity of disconnecting and disassembling the drive mechanism for this purpose.

These and other objects of the present invention will become more fully apparent by reference to the appended claims and as the following detailed description thereof proceeds in reference to the accompanying drawings wherein:

Figure 3 is a sectional view of the assembly of Figures 1 and 2 taken substantially along the line 3—3 of Figure 2;

Figure 4 is a fragmentary sectional view of the drive train interconnecting the pneumatically powered turbine rotor with the escapement control power output shaft, being a section taken susbtantially along the line 4—4 of Figure 3;

Figure 5 is a fragmentary sectional view, the section plane being taken through the common axis of the turbine wheel and escapement controlled power output shaft of the assembly, and Figure 6 is a fragmentary sectional view taken along the line 6—6 of Figure 3 illustrating the improved nozzle assembly in detail.

Figure 1:
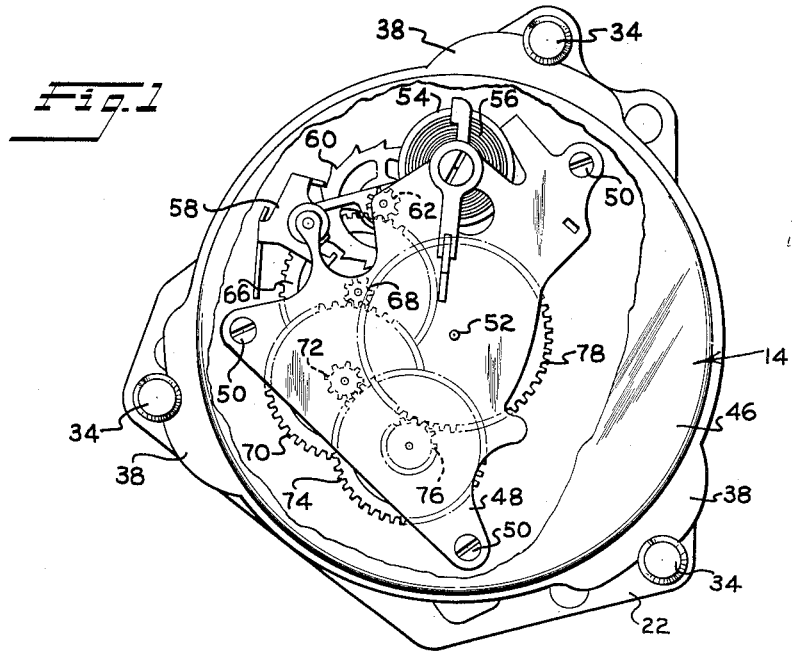
Figure 1 is an end view in elevation of a pneumatically powered drive mechanism for an escapement controlled drive shaft embodying the principles of the present invention.
Figure 2:
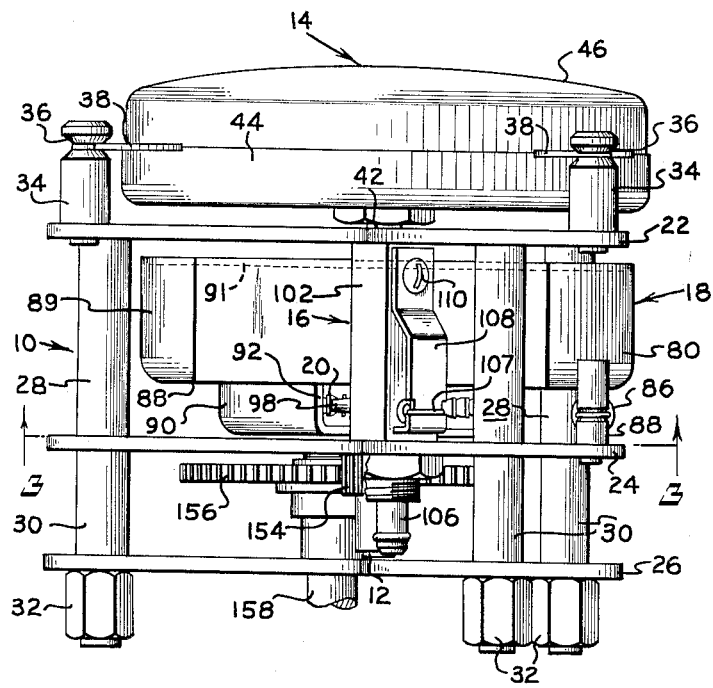
Figure 2 is a side elevational view of the assembly of Figure 1.

Referring now to the drawings in detail and particularly in reference to Figures 1 and 2, the illustrated drive assembly, which is constructed in accordance with the principles of the present invention, is shown to comprise, in general, a support structure 10 upon which is journalled a driven shaft 12, better shown in Figure 5, which is coupled to and the rate of rotation of which is controlled by an escapement mechanism 14, and a pneumatically powered drive mechanism for applying drive torque to the shaft 12 and the escapement mechanism 14 which drive mechanism includes a nozzle assembly 16 adapted to be coupled to a source of fluid, such as air, under pressure and to direct a stream of such fluid therefrom, and a drive mechanism assembly 18 including a turbine rotor 20 which is normally disposed within the path of the fluid stream discharged from the nozzle assembly 16 and which is drive coupled to the shaft 12 through a drive train which will be described in detail hereinafter.

The support structure 10 is formed by three spaced parallel plates 22, 24 and 26 which are held in such spaced parallel relation by spacers 28 interposed between plates 22 and 24, sleeves 30 interposed between plates 24 and 26 and screws 32 each of which extends through plates 26, a sleeve 30 and plate 24 and is threadedly received into the adjacent end of the aligned spacer 28 to form a rigid assembly. Upon the plate 22 are fixed a plurality of mounting lugs 34 equiangularly spaced about the axis of shaft 12 and each of which is formed with an annular groove 36 for cooperative reception of the edges of projections 38 upon the casing of the escapement mechanism 14 to provide a bayonet type mount for such mechanism upon the support structure 10 as is best illustrated in Figure 1.

As is best illustrated in Figure 5, the shaft 12 extends through the entire assembly and is provided at its end adjacent escapement mechanism 14 with an enlarged extension 39 fixed thereto and formed with a recess 40 of non-circular cross section and into which is received a short similarly non-circular coupling shaft 42 which connects the shaft 12 to the escapement mechanism 14.

The escapement mechanism 14 is mounted within a housing formed by a cup-shaped member 44 provided with a transparent cover 46 and is assembled upon a pair of identical spaced aligned parallel plates 48 which are fixed to the housing member 44 in such relation by spaced screws 50. The active parts of the escapement mechanism 14 are connected to shaft 12 by a shaft 52 (Figure 1) which at its lower end is formed with a recess of non-circular cross-section similar to recess 40 in shaft extension 39 for reception in driving engagement of the end of coupling shaft 42 and which is journalled between the spaced plates 48.

This escapement mechanism 14 may be of any suitable standard type and in its disclosed form includes a balance wheel 54 which is conventionally coupled to a hair spring 56 and connected by an oscillating pilot lever 58 to an escapement wheel 60. The escapement wheel 60 is operatively connected to the shaft 52 by a meshed gear train consisting of a pinion 62 fixed to wheel 60, a gear 66 meshing with pinion 62, a pinion 68 fixed to gear 66, a gear 70 meshing with pinion 68, a pinion 72 fixed to gear 70, a gear 74 meshing with pinion 72, a pinion 76 fixed to gear 74, and gear 78 meshing with pinion 76 and fixed to the shaft 52. Gear 66 and pinion 68, gear 70 and pinion 72, and gear 74 and pinion 76 respectively form gear clusters which are mounted for rotation about independent spaced parallel axes between the plates 48. A substantailly constant biasing torque is applied to the escapement wheel 60 through the connecting shaft 42, the shaft 52 and the gear train just described to provide the necessary biasing torque to effect operation of the escapement mechanism. The mechanism producing such biasing torque will now be described in detail.

Referring now to Figures 2 and 3, the drive mechanism for the escapement controlled drive or output shaft 12 is supported within a casing 80. The casing 80 is mounted for limited rotational movement coaxial with shaft 12 in a path lying between the plates 22 and 24 of the support structure 10. The limits of rotary movement of the casing 80 are defined by the engagement of a projecting spring stud 82 (Figure 3) fixed thereon with the opposite ends of a notch 84 formed in the edge of the plate 24, casing 80 being resiliently biased toward one of its limit positions by a tensioned coil type spring 86 extending between the spring stud 82 and a second spring stud 87 fixed to the plate 24.

The casing 80 is preferably a cup-shaped die casting having an end wall 88, a peripheral side wall 89 and a centrally located portion 90 projecting from end wall 88 and is closed at its open end by a plate 91. The projecting portion 90 of casing 80 is formed with a plurality of spaced apertures 92, 94 and 96, shown best in Figure 3, to permit entrance to and exit from the projecting portion 90 of the motive fluid stream from nozzle assembly 16. The turbine rotor 20 is located within this projecting portion 90 and retained therein by a centrally apertured retainer disk 97 which forms a partition separating the projecting portion 90 of said casing 80 from the remainder thereof.

Nozzle assembly 16 is provided with a nozzle 98 which is so constructed and mounted as to direct a fluid stream through aperture 92 for impingement upon the periphery of the turbine rotor 20 so long as the casing 80 remains toward its extreme counterclockwise position as viewed in Figure 3. As is best illustrated in Figure 3, the turbine rotor 20 is formed with a plurality of peripheral radially extending blades 100 which lie in the path of the fluid stream discharged under pressure through the bore 101 of nozzle 98 of the nozzle assembly 16 against blades 100 through aperture 92 and exits from casing 80 through aperture 96.

The nozzle assembly 16 (Figures 3 and 6) comprises a main body member 102 formed with a bore 104 which is aligned with a bore 105 in nozzle 98 intersecting the main bore 101 of the nozzle 98. Body member 102 as is best shown in Figure 2, is provided externally at one end with a fitting 106 for the reception of a coupling for connection to a fluid conduit. The bore 101 of nozzle 98 extends completely through nozzle 98 and a small wire 107, which is connected exteriorly of member 102 to a spring finger 108 fixed to the body member 102 as by screw 110, extends into the bore 101 through the end opposite the discharge end thereof. Nozzle 98 is formed at such end into a tapered configuration as shown to reduce the size of bore 101 to provide a sliding fit therein for wire 107. This assembly permits cleaning of the nozzle bore quite readily in that by pressing the spring finger 108 toward the body member 102, the wire 17 will be forced through the bore of the nozzle 100 to a position in which it projects slightly beyond the discharge end thereof and thus clean the bore 101 of the nozzle 98 of any accumulated debris. Upon release of the spring finger 108, due to its resiliency, the wire 107 is withdrawn to its illustrated position in which it does not project through the outlet end of the bore 101 of the nozzle 100.

The drive mechanism between the turbine rotor 20 and the shaft 12 consists of a gear train which is supported within the housing 80 by two spaced parallel plates 112 and 114 which are held in such rigidly spaced parallel relation by a plurality of spacers 118 and which are secured to the end cover plate 91 of casing 80 by screws 120 in the manner illustrated in Figure 4. This assembly including plate 91 is suitably secured to the end wall 88 of casing 80 as by screws (not shown). The turbine wheel 20 is joined through the aperture 122 of disk 97 by a sleeve 123 to a pinion 124 (Figure 5). The shaft 12 is driven from the turbine wheel 20 by a gear train shown in Figures 3 and 4 comprising the pinion 124, a gear 126 constantly meshed therewith, a pinion 128 fixed for rotation with gear 126, a gear 130 constantly meshed with pinion 128, a pinion 132 fixed to gear 130, a gear 134 constantly meshed with pinion 132, a pinion 136 fixed to gear 134, a gear 138 constantly meshed with pinion 136, a pinion 140 fixed to gear 138, a gear 142 constantly meshed with pinion 140, a pinion 144 mounted for rotation coaxial with gear 142 and normally drive connected thereto for concomitant rotation by a friction drive coupling of the spider spring type 146, and a gear 148 fixed for conjoint rotation with the shaft 12 in constant mesh with the pinion 144. Gear 126 and pinion 128, gear 130 and pinion 132, gear 134 and pinion 136, gear 138 and pinion 140, gear 142, friction drive 146 and pinion 144 form gear clusters mounted for rotation upon the plates 112 and 114 about axes spaced from and parallel to the common axis of shaft 12 and turbine rotor 20 and pinion 124.

From the foregoing detailed description of this drive train it is apparent that these gear clusters form an epicyclic gear train interconnecting the turbine rotor 20 with the shaft 12. Since the angular velocity of the shaft 12 is controlled by the escapement mechanism 14, there is a predetermined angular velocity of the turbine rotor 20, dependent upon the speed reduction ratio through this epicyclic gear train, at which the casing 80 will remain stationary relative to the axis of shaft 12. If the angular velocity of the turbine rotor 20 exceeds this predetermined angular velocity, the casing 80 will tend to rotate about the axis of shaft 12 in opposition to the spring 86 whereas if the angular velocity of the turbine rotor 20 decreases below such predetermined angular velocity, the casing 80 will tend to rotate about the axis of shaft 12 in the opposite direction under the influence of the resilient biasing force of spring 86.

As is apparent in Figure 3, the fluid discharged from the nozzle 98 of the nozzle assembly 16 passes through the aperture 92 in the casing projection 90 to impinge upon the blades 100 of the turbine rotor 20. When the casing 80 rotates in opposition to the force of the spring 86 in the manner previously described, as a result of the angular velocity of rotor 20 exceeding such predetermined velocity the aperture 92 of the projection 90 shifts gradually into a first position in which the side wall 150 of projection 90 partially blocks the passage of the stream of fluid from the nozzle 98 to the blades 100 and finally to a position in which the passage of fluid from the nozzle 100 to the blades 98 is completely blocked by the peripheral wall 150 of the projection 90. This peripheral wall 150 and the edge of the aperture 92 of the projecting portion 90 form a valve or shield which is shiftable into the path of the fluid discharged from the nozzle 100 for controlling the impingement of such fluid upon the blades 100 and thereby for controlling the angular velocity of the turbine rotor 20. The edge of aperture 92 through wall 150 is preferably straight and parallel to the axis of rotation of casing 80 so that the stream from nozzle 98 is gradually cut off by clockwise movement casing 80 from impingement on rotor 20.

From the foregoing it is apparent that the spring 86 forms an energy storing device which continuously exerts a biasing torque through the gear 148 upon the shaft 12 and through the connecting shaft 42 upon the escapement mechanism 14. When the angular velocity of the turbine wheel 20 exceeds the predetermined angular velocity, previously referred to, the housing 80 is caused to rotate about the axis of shaft 12 and thus store energy in the spring 86. The valve-like shield for the turbine rotor 20 formed by the straight edge of the peripheral wall 150 at aperture 92 of the projection 90 moves with the housing 80 to various adjusted positions in accordance with the relationship of the angular velocity of the shaft 12 to that of the turbine rotor 20 and thus varies the rate of energy extraction from the stream discharged from the nozzle 100 in accordance with such relation.

The escapement controlled shaft 12 may be coupled as shown in Figures 2 and 5 through a unidirectional clutch mechanism 152 to a pinion 154 in constant mesh with a gear 156 to provide a drive to a final power output 158 to which the gear 156 is fixed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with an escapement mechanism and an output shaft controlled thereby; means for imparting drive torque to said escapement mechanism controlled output shaft comprising a turbine rotor, means coupling said output shaft to said rotor, means for directing a stream of fluid under pressure to said turbine rotor, means operable to shield said turbine rotor from the fluid stream formed by said directing means, and means responsive to variations in the relative rate of rotation of said output shaft and said turbine rotor for controlling the actuation of said shielding means.

2. In combination, a rotatable shaft, a turbine rotor, an escapement connected to said shaft for controlling the rate of rotation thereof, means including an energy storage device drive connecting said turbine rotor to said shaft, a nozzle for discharging a stream of fluid under pressure directed toward said turbine rotor, and means for controlling the rate of energy transmission to said storage device from said turbine rotor including means controlled in accordance with the relation of the rates of rotation of said shaft and said rotor for controlling the proportion of the stream of discharged fluid which effectively impinges upon said turbine rotor.

3. In combination, a rotatable shaft, a turbine rotor, an escapement mechanism connected to said shaft for controlling the rate of rotation thereof, means including an energy storage device drive connecting said turbine rotor to said shaft, means for directing a stream of fluid at a substantially constant dynamic pressure towards said turbine rotor, and means controlled in accordance with the relation of the rates of rotation of said shaft and said rotor for controlling the rate of energy transmission from said turbine rotor to said storage device including means for controlling the rate of energy extraction by said turbine rotor from said fluid stream.

4. In combination with an escapement mechanism, an output shaft controlled thereby, and a support structure carrying said escapement; means for imparting power to said escapement mechanism comprising a turbine rotor mounted for rotation relative to said support structure, a nozzle mounted on said support structure for directing a stream of fluid under pressure against said turbine rotor to impart rotation thereto, a drive train connecting said turbine rotor to said output shaft, a valve member carried by said support structure and movable between said nozzle and said turbine rotor to control the impingement of the fluid stream upon said turbine rotor, and means responsive to variations in the relative rate of rotation of said shaft and said turbine rotor for controlling the movement of said valve member.

5. In combination, a support structure comprising a pair of rigidly spaced parallel plates, a casing mounted between said plates for rotation relative thereto between predetermined limit positions, a turbine rotor mounted upon said casing for rotation coaxial with said casing, rotatable shaft means extending through said casing and plates coaxial with said turbine rotor, an escapement mounted on one of said plates and connected to said shaft means for controlling the rate of rotation thereof, a drive train carried by said casing and connecting said turbine rotor to said shaft means, means resiliently biasing said casing toward one of said limit positions, means mounted upon one of said plates for directing a stream of fluid under pressure to said turbine rotor for imparting rotation thereto, said drive train being operable in response to an increase in the rate of rotation of said turbine rotor above a predetermined rate relative to the escapement controlled rate of rotation of said shaft for imparting rotative movement to said casing in opposition to said biasing means, and means responsive to said rotative movement of said casing for controlling the impingement of said fluid stream upon said turbine rotor.

6. In combination, a support structure, a shaft mounted upon said support structure by spaced bearings, an escapement mechanism for controlling the rate of rotation of said shaft, means mounted upon said support structure for directing fluid under pressure in a stream normal to but spaced from the axis of said shaft, means for extracting the energy from said fluid stream and transmitting the extracted energy to said shaft comprising a housing structure rotatably received upon said shaft intermediate said spaced bearings, means resiliently biasing said housing toward one of two limit rotative positions, a turbine rotor carried by said housing coaxial with said shaft and disposed in the path of said fluid stream, a train of gears drive connecting said shaft and turbine rotor and including a first gear fixed to said shaft and a second gear fixed to said turbine rotor and interconnecting gears journalled upon said housing whereby said housing will assume a position between such limit positions in accordance with the relation of the rate of rotation of said turbine wheel to that of said shaft, and means on said housing operable in accordance with the rotative position of said housing between such limits for controlling the extraction of energy from said stream by said turbine rotor.

7. In combination, a rotatable shaft, an energy storage device connected and operable to bias said shaft in a predetermined rotative direction, an escapement mechanism coupled to said shaft for controlling the rate of rotation thereof under the biasing influence of said energy storage device, a fluid motor connected to transmit energy to said storage device, means for directing a substantially constant energy stream of fluid under pressure to said fluid motor, and means operable in accordance with the relation of the rate of energy withdrawal from said storage device to the rate of energy transmission to said storage device for controlling the rate of extraction of energy from said fluid stream by said motor.

8. In combination with an escapement controlled drive shaft, and support structure therefor means for imparting drive torque to said shaft comprising a first gear drive connected to said shaft, a casing rotatably mounted coaxial with said gear, a second gear journalled on said casing in constant mesh with said first gear, a turbine rotor journalled on said casing, means drive connecting said rotor to said second gear, means resiliently biasing said casing toward a limit position in the direction of rotation of said first gear, means on said support structure for directing a stream of motive fluid at a substantially constant mass rate of flow against said turbine rotor while said casing is in said limit position, and means operable upon movement of said casing from said limit position in opposition to said biasing means for reducing the rate of energy extraction from the fluid stream by said rotor.

References Cited in the file of this patent

UNITED STATES PATENTS

| | | |
|---|---|---|
| 704,333 | Hurst | July 8, 1902 |
| 2,004,909 | Benson | June 11, 1935 |
| 2,257,404 | Urbanski | Sept. 30, 1941 |
| 2,292,090 | Reichel | Aug. 4, 1942 |